United States Patent [19]
Weiss et al.

[11] Patent Number: 5,774,703
[45] Date of Patent: Jun. 30, 1998

[54] DATA PROCESSING SYSTEM HAVING A REGISTER CONTROLLABLE SPEED

[75] Inventors: Karl Robert Weiss, Singapore, Singapore; John Nicholas Shemelynce, Plantation, Fla.

[73] Assignee: Motorola, Inc., Schaumburg, Ill.

[21] Appl. No.: 583,259

[22] Filed: Jan. 5, 1996

[51] Int. Cl.$^6$ ........................................... G06F 1/08
[52] U.S. Cl. ........................................... 395/556; 395/559
[58] Field of Search ........................... 395/556, 559, 395/560, 750.04

[56] References Cited

U.S. PATENT DOCUMENTS

| | | | |
|---|---|---|---|
| 4,615,005 | 9/1986 | Maejima et al. | 364/200 |
| 4,686,386 | 8/1987 | Tadao | 307/269 |
| 4,893,271 | 1/1990 | Davis et al. | 364/900 |
| 5,155,840 | 10/1992 | Niijima | 395/550 |
| 5,205,387 | 4/1993 | Frane | 364/493 |
| 5,222,239 | 6/1993 | Rosch | 395/750 |
| 5,247,655 | 9/1993 | Khan et al. | 395/550 |
| 5,432,468 | 7/1995 | Moriyama et al. | 327/152 |
| 5,537,581 | 7/1996 | Conary et al. | 395/550 |

FOREIGN PATENT DOCUMENTS

| | | | |
|---|---|---|---|
| 4-79003 | 5/1986 | Japan | G06F 1/04 |

*Primary Examiner*—Dennis M. Butler
*Attorney, Agent, or Firm*—Robert L. King; Juliana Argon

[57] ABSTRACT

A data processing system having register controllable processor speed includes a central processor (110) which operates at a selectable address bus clock speed (122) and subsystem components (115) also having selectable speeds. Subsystem clock provision conductors (124) independently provide a selectable subsystem clock speed for each of the subsystem components. Addressable registers (200, 250, 300) store a plurality of optimum address bus clock speed and subsystem clock speed values. A selector circuit (137, 138) reads a first addressable register to provide the optimum speed value for use as the selectable address bus clock speed of the central processor and reads a second addressable register to provide the optimum speed value for use as the selectable subsystem clock speed of a first subsystem clock component.

10 Claims, 4 Drawing Sheets

| TASK 1 | LOWER TASK LIMIT 1 (LTL 1) | UPPER TASK LIMIT 1 (UTL 1) | TASK FREQUENCY SELECTION 1 (TFS 1) |
|---|---|---|---|
| TASK 2 | LOWER TASK LIMIT 2 (LTL 2) | UPPER TASK LIMIT 2 (UTL 2) | TASK FREQUENCY SELECTION 2 (TFS 2) |
| ⋮ | ⋮ | ⋮ | ⋮ |
| TASK Z | LOWER TASK LIMIT Z (LTL Z) | UPPER TASK LIMIT Z (UTL Z) | TASK FREQUENCY SELECTION Z (TFS Z) |
|  |  |  | INTERRUPT FETCH FREQUENCY SELECTION (IFFS) |
|  |  |  | DEFAULT FREQUENCY SELECTION (DFS) |

FIG.2

| | |
|---|---|
| OCR CLOCK SELECTION REGISTER | $F_4$ |
| ICR CLOCK SELECTION REGISTER | $F_3$ |
| REAL TIME INTERRUPT CLOCK SELECTION REGISTER | $F_1$ |
| SCI CLOCK SELECTION REGISTER | $F_2$ |

FIG.3

DATA PROCESSING SYSTEM HAVING A REGISTER CONTROLLABLE SPEED

TECHNICAL FIELD

This invention relates in general to digital circuits, and more particularly to power saving arrangements for clocked digital circuits such as data processors.

BACKGROUND OF THE INVENTION

A clocked data processor, e.g. a microcontroller, a microcomputer, or a RISC (Reduced Instruction Set Computing) processor, includes a central processor unit (CPU) core and its associated data processor subsystem components, which all consume power. The higher the clock speed of the data processor the more power the data processor consumes. The need to curtail power consumption in a clocked data processor is well known in power sensitive applications, such as in the battery (or any other stored energy power source) operated portable radio, cellular, and paging arts. To conserve battery life in a radio for example, the clock speed of the data processor has been externally varied as a function of the current operating mode of the radio. However, this clock-shifting is successful only for functions that are operating mode dependent. Subfunctions that are not radio operating mode dependent, such as the serial bus, could not be clock-shifted in the same manner. Coordinating changing the data processor or address bus clock with real time asynchronous functions, without affecting their integrity, thus became very complex. A change in bus speed would also effect all the subsystem components which would greatly increase the complexity of the software design and also decrease the reliability of the design in general. Accordingly, there is a need to provide a simpler and improved power saving arrangement for the data processor such that shifting of the processor clock or address bus frequency does not affect the other subfunctions in the data processor.

SUMMARY OF THE INVENTION

Briefly, according to the invention, there is provided a data processing system having register controllable processor speed includes a central processor which operates at a selectable address bus clock speed and a plurality of subsystem components. Connected to the plurality of subsystem components, a plurality of subsystem clock provision conductors independently provide a selectable subsystem clock speed for each of the plurality of subsystem components. A plurality of addressable registers store a plurality of optimum speed values for use as the selectable address bus clock speed and the selectable subsystem clock speed for each of the subsystem components. A selector circuit reads the contents of a first one of the addressable registers to provide the optimum speed value for use as the selectable address bus clock speed of the central processor and of a second one of the addressable registers to provide the optimum speed value for use as the selectable subsystem clock speed of a first one of the plurality of subsystem clock provision conductors for a first one of the plurality of subsystem clock components. Coupled to the central processor, the plurality of subsystem components, the plurality of addressable registers, and the selector circuit, a communication bus communicates the contents of the plurality of addressable registers for use by the selector circuit to enable the reduction of power usage dependent upon which frequency is selected.

BRIEF DESCRIPTION OF THE DRAWINGS

FIG. 2 is a task register memory model of the registers 200 and 250 of FIG. 1.

FIG. 3 is a register memory model of the register 300 of FIG. 1.

DETAILED DESCRIPTION OF THE PREFERRED EMBODIMENT

Figure 1:
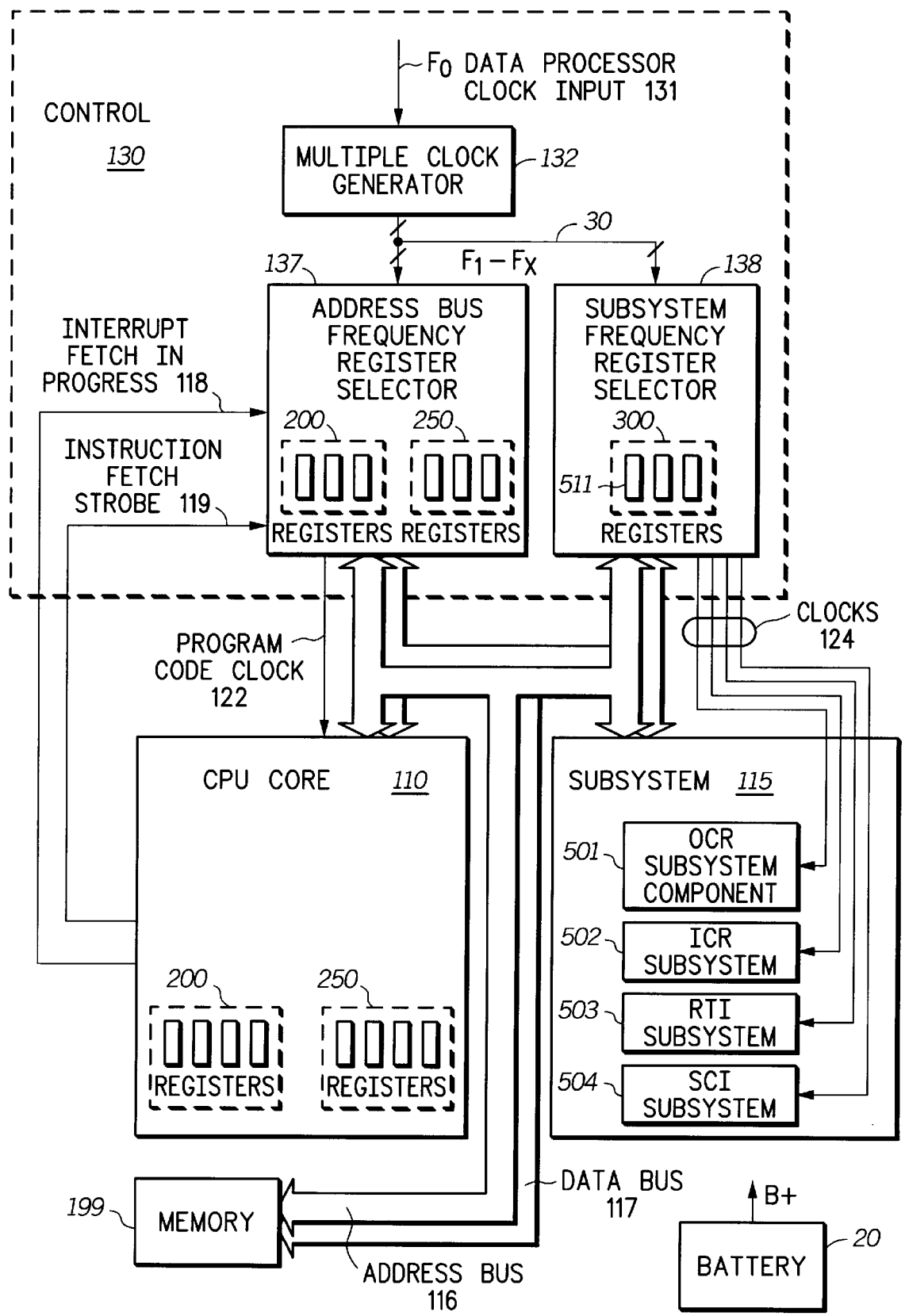
FIG. 1 is a block diagram of a data processor in accordance with the present invention.

Referring to FIG. 1, a clocked digital circuit such as a single-chip data processor or microprocessor (MPU) includes a central processing unit (CPU) core or microprocessor 110 in its main system and an associated peripheral microcomputer subsystem block, controller, or other subsystem 115. One example of subsystem functions is a programmable timer found on the Motorola MC68HC11F1 microcomputer which includes an output compare timer function, implemented as a portion of the OCR subsystem component 501, and which is controlled by at least one Output Compare Register (OCR) 511 (FIG. 3) residing in a plurality of subsystem registers 300 with an associated OCR clock provided by one of a plurality of clocks 124 for subsystem 115. In accordance with the teachings of the present invention, all the peripheral clocks are set-up independent of each other and of a program code clock 122. An input capture timer function includes at least one Input Compare Register (ICR) within registers 300 with an associated ICR clock for an ICR subsystem component 502. Other subsystem components include a Real Time Interrupt (RTI) Subsystem 503, Timers, Serial Communication Interface (SCI) Subsystem 504, and a Serial Peripheral Interface (SPI) which is not shown.

A control circuit 130 includes a variety of digital circuits to separately control the frequencies of clocks 124 for subsystem 115 and the independent program code clock 122 for the CPU core 110. The CPU core 110, the subsystem 115, and the control circuit 130 are intracoupled with interface signals including a communication bus comprising an address bus 116 and a data bus 117. As with a battery 20 which supplies B+ to everything in the data processor that needs energy to run, the address and data bus represents a common access mechanism for communicating data everywhere in the data processor. Specifically, the address bus 116 is the communication medium used to fetch or provide particular addresses of the microcomputer's memory map within memory 199 and data bus 117 communicates data values for use by system. In the Motorola microcomputer 68HC11, the address bus is sixteen bits wide.

The program code clock 122 is the clock which CPU core 110 uses for timing in order to operate. Program code clock 122 also controls the timing for CPU core 110 to access memory 199 via address bus 116 and data bus 117, and to access any other portion of the data processor system.

The control circuit 130 includes a data processor clock input 131 having a frequency F0. Clock input 131 is used as a synchronized reference for a multiple clock generator 132 to provide the set of available clock frequencies to an Address Bus Frequency Register Selector 137 and a Subsystem Frequency Register Selector 138. Frequency Register Selector 137 and Subsystem Frequency Register 138 collectively function as a monitoring circuit to read the contents of addressed registers (200, 250, 300) to provide an optimum speed value for use as the frequency of program code clock 122 and to provide the optimum frequencies for each of the clocks 124 for subsystem 115. A crystal oscillator (not shown) preferably generates the data processor clock input frequency fo 131.

Other interface or processor status type signals, such as an Interrupt fetch In Progress Signal 118 and an Instruction Fetch Strobe conductor 119 are used by the Address Bus Frequency Register Selector 137 to frequency control the Program code clock 122 in an inventive power saving arrangement. However, the Subsystem Frequency Register Selector 138 need not use the additional Interrupt fetch In Progress Signal 118 and the Instruction Fetch Strobe conductor 119 to independently program the various subsystem clock provision conductors 124 for the data processor subsystem 115.

System memory 199 is bi-directionally connected to the address and data bus 116 and 117 and comprises an addressable array of static random access memory (RAM) cells, read only memory (ROM) cells organized in rows and columns. The ROM stores a plurality of tasks which are instructions that are retrieved, or read from ROM and run by the CPU core 110 in a predetermined sequence, thereby executing the particular task. System memory 199 may be external to the data processor, or may be on the same integrated circuit (IC) as the data processor.

Registers 200, 250, and 300 are memory storage elements that exist in the memory map of the data processor that can be read and written to by the data and address bus 117 and 116. The registers are like RAM cell locations except that the registers are each defined for a certain function. It is not important where all the registers 200, 250, and 300 are located, as long as they are all accessible by the address and data bus 116 and 117.

A first plurality of registers called Interrupt Program Flow Speed Select registers 250 are located in the address bus frequency register selector 137 and correspond to each interrupt detected by the CPU core 110. The register values contain the data for specifying the desired clock speed for that interrupt. The Interrupt Fetch In Progress conductor 118 normally LOW is asserted HIGH when an interrupt is first detected by the CPU core 110 and stays HIGH while the interrupt vector is being fetched and all associated registers 250 are being put on the register stack. Since interrupts are usually critical operations, the desired interrupt clock speeds will tend to be the higher clock frequencies which consume more power.

A second plurality of registers called Non-interrupt Program Flow Speed Adjust registers 200 are also located in the address bus frequency register selector 137 and correspond to different task sections of software program code. Depending on whether the task can be executed successfully at a lower speed, the lower speeds will be more optimally allocated by the programmer for particular tasks stored at specific addresses to save more energy. These program registers 200 will specify the sections of code they are associated with, and the desired clock speed for that particular section of code. Normally LOW, the Instruction Fetch Strobe 119 will be asserted HIGH when the first byte of a new instruction of the program code is fetched from a particular address in memory 199. When the CPU 110 enters that section of code, as indicated by the Instruction Fetch Strobe 119, the CPU will internally switch to the clock speed specified in that particular register 200.

A third plurality of registers called Subsystem Speed Select registers 300 are located in the subsystem 115 and correspond to the different subsystem sections or components 501-504 which are independently programmed and timed separately from each other, in accordance with the teachings of the present invention via their separate subsystem clock provision conductors 124. Each section or component of the subsystem will run at the specified speed programmed as register data and stored in the specified register, regardless of the address bus clock. Hence, the Subsystem Frequency Register Selector 138 will use the associated particular subsystem register value to independently drive each of the various subsystem clock provision conductors 124 for the subsystem 115. Meanwhile the Address Bus Frequency Register Selector 137 picks the frequency command specified by the associated program register 200, unless an interrupt overrides the program register selection as indicated by the Interrupt fetch In Progress Signal 118, to select an interrupt register 250 instead, to provide the selected frequency to the Program code clock 122.

Referring to FIG. 2, a Program 200 and Interrupt 250 Register Model of a portion of the microcomputer's memory map 199 is represented and available for data processor usage upon initialization. Organized by tasks, this register model defines the task structure and associated frequency selection for each task that have been pre-assigned by the programmer of the code.

Each task has three values associated with it. The first value is the address in which the task starts which is called the Lower Task Limit (LTL). The second value is the address in which the task ends which is called the Upper Task Limit (UTL). A task is assumed to exist completely within these address bounds. Hence, the task is defined by the address boundaries of a plurality of memory location tester registers (Lower Task Limit LTL 210 and Upper Test Limit UTL 220 as seen in the following example 1) for finding the addressed memory location containing the code for executing the particular task. The third value is the Task Frequency Selection TFS 201-203 which selects one of the x number of frequency choices that are available for use by that task. In the embodiment shown in FIG. 4, the number of frequency choices x is equal to sixteen, therefore the number that can be stored in these TFS locations will vary from 0 to (x−1) for picking one of the sixteen frequencies f1–f16. The maximum number of tasks z can be selected by the program code designer and is not constrained by any technical limitations of this invention.

The Interrupt Fetch Frequency Selection (IFFS) 414 is the frequency that is selected when an interrupt fetch is in progress (118) to override the current frequency used. However, when an interrupt fetch (118) is not in progress and the address of the current executing code does not fall within any of the task boundaries, the Default Frequency Selection (DFS) 420 is the frequency that is selected.

Example 1 shows the assumptions and a fragment of the code sequence that could be executing in accordance with the teachings of the present invention:

Assumptions:

data processor clock input = 4 MHz = fo
$F_1$ = 1 MHz (for a highly real-time critical task such as demodulation)
F2 = 500 KHz
F3 = 333.3 KHz
F4 = 250 KHz
Output Compare Interrupt Vector $1500

-continued

* Using 68HC11 instruction set
Task Table:

| Task Number | Lower Task Limit | Upper Limit | Task Frequency Selection |
|---|---|---|---|
| TASK1 | $1000 | $1325 | $F_1$ |
| TASK2 | $1326 | $15AF | $F_3$ |
| TASK3 | $15B0 | $C000 | $F_2$ |
| Interrupt Fetch Frequency Selection (IFFS) | | | $F_1$ |
| Default frequency Selection (DFS) | | | F4 |

Code Sequence (Code Fragment):

| Address (L.A.B.) Address | Instruction | Bus Clock | Task Number |
|---|---|---|---|
| $1000 | LDAA TEMP1 | $F_1$ | Task 1 |
| $1003 | STAA TEMP2 | $F_1$ | Task 1 |
| $1006 | JMP $1326 | $F_1$ | 1 |
| $1326 | STAA TEMP3 | F3 | 2 |
| $1329 | JMP $8000 | F3 | 2 |
| $8000 | CLI | F2 | 3 |
| Event of Output Compare Interrupt 14 Bus Cycles to fetch interrupt vector and stack registers | | $F_1$ | Use IFFS During 14 cycles See Note 1 |
| $1500 | CLRA | $F_3$ | 2 |
| $1501 | STAA TEMP4 | $F_3$ | 2 |
| $152A | RTI | $F_3$ | 2 |
| $8001 | JMP $C100 | $F_2$ | 3 |
| $C100 | CLRA | $F_4$ | Use DFS |
| $C101 | STAA TEMP5 | $F_4$ | DFS |

Note 1: For the 14 cycles that it took to fetch the interrupt vector and stack the registers the "Interrupt Fetch In Progress" conductor 119 was active.

Figure 4:
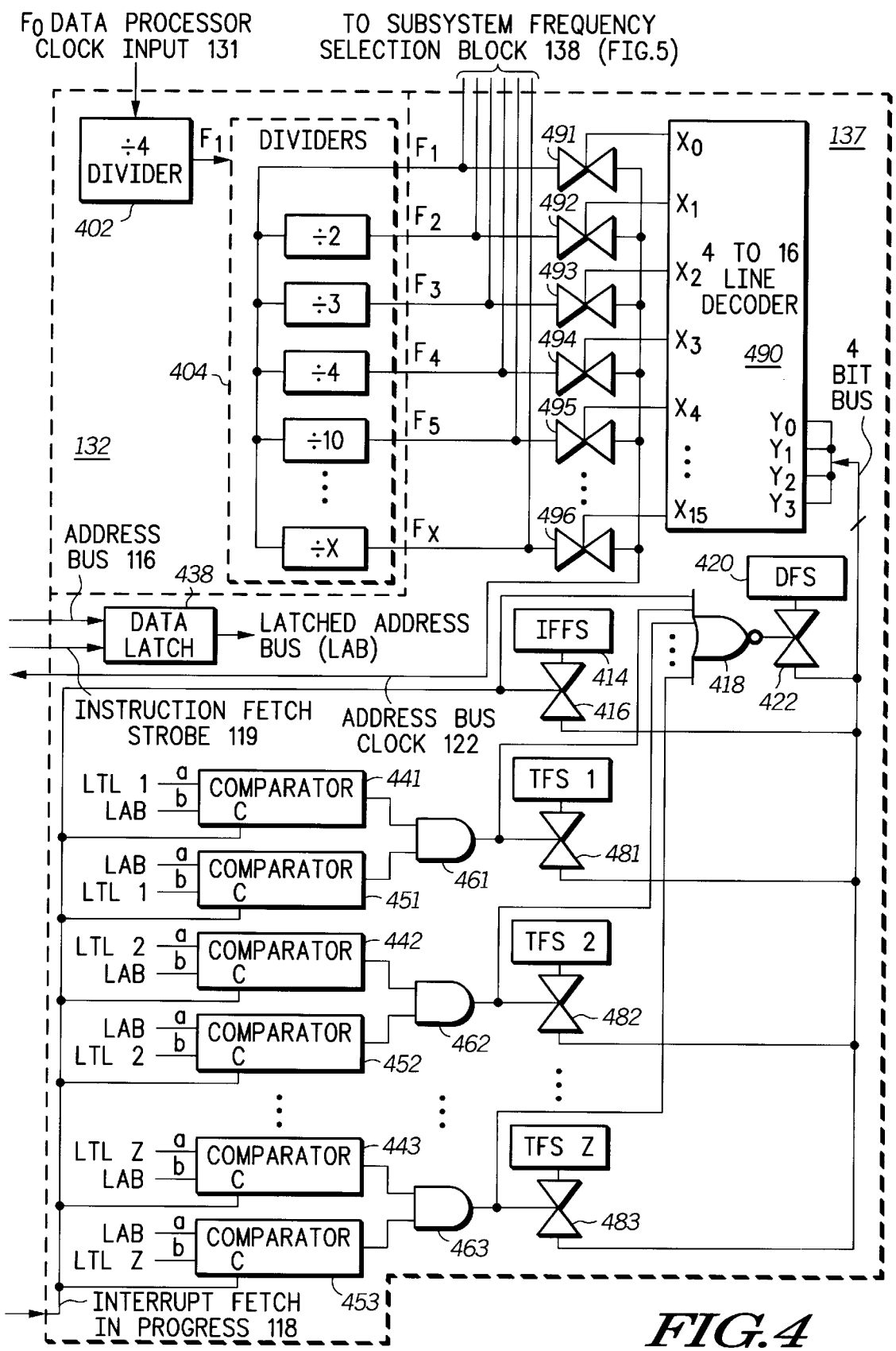
FIG. 4 is a block diagram of the multiple clock generator 132 and address bus frequency selector 137 of FIG. 1.

Referring to FIG. 3, a subsystem register 300 model of another portion of the microcomputer's memory map 199 is represented and defines the independent frequency selection for each component of the subsystem 115 in the data processor. Each subsystem component in the data processor has an associated frequency selection 511 that is individually assigned in this register model. In the example of FIG. 4, the available quantity of selectable frequencies in the multiple clock generator 132 is sixteen. Therefore the number that can be stored in these locations is in the range from 0 to (x−1) for picking one of the sixteen different frequencies for each of the subcomponents of the subsystem.

Referring to FIG. 4, the Multiple Clock Generator 132 and the Bus Frequency Register Selector 137 of FIG. 1 are shown in more detail. The Multiple Clock Generator 132 is where the plurality of frequencies are derived from the oscillator input fo 131. The data processor clock input or oscillator crystal frequency fo 131 is initially divided by four in a first frequency divider 402. This divide-by-four circuit 402 is standard in the Motorola 68HC11 microcomputer. A first frequency F1 is generated at the output of the divider 402 which is then divided down into lower frequencies F2, F3, F4, F5, . . . Fx in a divider bank having a plurality of different frequency dividers 404. A resultant plurality of different clock speed provision conductors 30 are now internally and individually available for the data processor to use. To save even more current, each of these individually derived clocks could also be stopped if they are not required for a particular process.

The Bus Frequency Register Selector 137 is where the optimized frequency for each task is selected using the inputs from the Task Register Model of FIG. 2, as communicated and accessed by the address and data bus 116 and 117. The Address Bus 116 and the Instruction Fetch Strobe 119 are inputs to a data latch 438 which will latch the address (LAB) of the first byte of a new instruction. Normally LOW, the Instruction Fetch Strobe 119 will be asserted HIGH when the first byte of a new instruction of the program code is fetched from a particular address in memory 199 on the Address Bus 116 to latch or lock onto the current address location of the operating code. When the Instruction Fetch Strobe is LOW, the last address is retained as the output of the data latch 438.

The latched address bus data from the output of the data latch 438 is coupled into one input of a plurality of data comparators 441–443 and 451–453. The data comparators are used to determine which task range the current latched address is in if any. Each of the data comparator has three inputs a, b, c and one output.

When input c from the Interrupt Fetch In Progress conductor 118 is HIGH the output of the data comparator is always LOW. The Interrupt Fetch In Progress conductor 118 normally LOW is asserted HIGH at the input c of the comparator when an interrupt is first detected by the CPU core 110 and stays HIGH during the interrupt process. The Interrupt Fetch Frequency Selection (IFFS) is the frequency that is selected when an interrupt fetch is in progress (118) to override the current frequency used. A digital switch 416 is switched ON allowing the Interrupt Fetch Frequency Selection (IFFS) 414 of FIG. 2 to be read as frequency data and passed to a decoder 490 as the four bit input. Accordingly, the binary data of the Interrupt Fetch Frequency Selection (IFFS) 414 is applied as an input and the decoder 490 asserts a HIGH signal on one of the sixteen output conductors as a function of the four-bit binary IFFS 414. The HIGH output of this decoder 490 then opens one corresponding analog switch out of a plurality of switches 491–496 for the address bus clock frequency 122 of the data processor to be operated at the so selected frequency during the interrupt routine.

If input a is greater than input b then the output of the comparator is always LOW. The comparator output is HIGH when both of the previous conditions are not true. In other words, when input c from the Interrupt Fetch In Progress conductor 118 is LOW (no interrupts) and if input b is greater than input a. The lower LTL and upper UTL limits of each task are compared to determine if the latched address LAB is within any of the task's range as defined in FIG. 2. If both the lower LTL and upper UTL limit criteria of a particular task range's comparator pair are satisfied then the output of the coupled AND gate (461, 462, or 463) will be asserted HIGH. This HIGH signal at the AND gate's output will open a corresponding digital switch (481, 482, or 483) to read the appropriate frequency selection register contents for that task in the associated register address (201, 202, or 203). This register value in the form of a binary number (four bits y0–y3) will be coupled into a four-to-sixteen conductor decoder 490. The MC14514 CMOS decoder IC made by Motorola is one example of such a decoder 490. The decoder 490 takes the four input binary conductors as an input and asserts a HIGH signal on one of the sixteen output conductors as a function of the four-bit binary input number. Each of the decoder output conductors are connected to a plurality of switches 491–496 for selecting a different frequency output from the divider bank 404. The HIGH output of this decoder 490 then opens one corresponding analog switch for the appropriate selected address bus clock frequency 122 of the data processor.

A NOR gate 418 detects the application of at least one of the matched task range conductors coming out from the AND gates 461–463 or the application of the Interrupt Fetch In Progress conductor 118 for digitally switching OFF the Default Frequency Selection (DFS) 420 as read in the appropriate addressed register. Hence, when an interrupt fetch (118) is not in progress and the address of the current executing code does not fall within any of the task boundaries, a digital switch 422 is switched ON allowing the Default Frequency Selection (DFS) to be read as frequency data and passed to the decoder 490 as the four bit input. Accordingly, the binary data of the Default Frequency Selection (DFS) is applied as an input and the decoder 490 asserts a HIGH signal on one of the sixteen output conductors as a function of the four-bit binary DFS. The HIGH output of this decoder 490 then opens one corresponding analog switch out of a plurality of switches 491–496 to select the associated frequency for the default address bus clock frequency 122 of the data processor.

Figure 5:
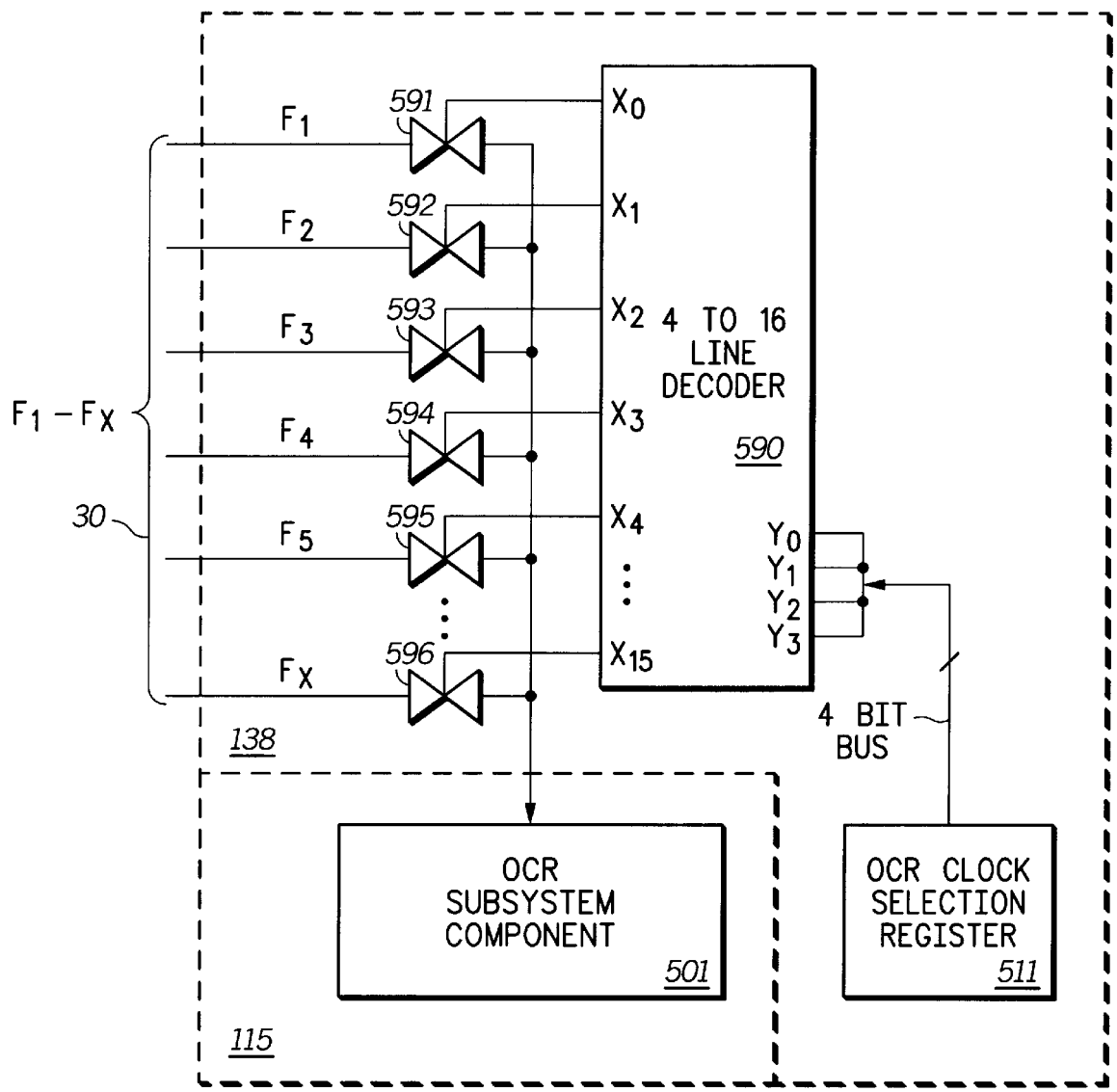
FIG. 5 is a partial block diagram of one component of the subsystem 115 and its clock speed controlled by the subsystem frequency selector 138.

Referring to FIG. 5 a partial implementation of the Subsystem Frequency Register Selector 138 for selecting the clock frequency of one component of the subsystem 115 is represented. As input sources for all the available choices of different frequencies, the Subsystem Frequency Register Selector 138 block receives the frequency selections (F1, F2, F3, F4, F5 . . . . , Fx) 30 that were derived in the multiple clock generator 132 of FIG. 4. For each subsystem component, a particular frequency selection, for example the binary representation of F4 written in the OCR clock selection register 511 pre-assigned in FIG. 3, is fed into a four-to sixteen conductor decoder 590 to select the appropriate frequency (f4) to drive the clock frequency of that subsystem component (Output Compare Clock subsystem component 501) in a similar way as described in FIG. 4. Hence in the OCR example, the binary data of the OCR clock selection register 511 is read and applied as an input by the decoder 590. In response, the decoder 590 asserts a HIGH signal on one of the sixteen output conductors as a function of the four-bit binary data. The HIGH output of this decoder 590 then opens one corresponding analog switch 594 out of a plurality of switches 591–596 for the Output Compare Clock frequency of this subsystem component 501, independent of all other clock frequencies chosen for the other subsystem components. Other subsystem components' clock frequencies would each have their own four-to-sixteen conductor decoders for selecting the appropriate frequency, in response to their subsystem component pre-assigned register values to drive that particular subsystem component in a similar way.

In general, the present invention teaches two independent sections for controlling various independent clock speeds. The first section is for controlling the clock speed of the address bus. The address bus clock speed selection is performed on a task basis which is defined by the programmer. Preferably, no task boundaries should overlap. In this manner, every software related task can run at an optimal address bus speed therefore saving the most current over other approaches. The task selection is defined by the programmer and can also be dynamically (while the software is running) set just by referring to the desired address location. Hence, address bus clock speed may be manually operated by having the desired task placed in a predetermined address which can be selected to invoke a desired operating address bus speed by the programmer.

The other area of interest is the subsystem frequency selection. This section not only allows the programmer to select the optimal frequency for each subsystem component for maximum current savings but allows the subsystem components to run independent of the processor bus speed. That is, the bus speed can be changing many times while all the subsystem components maintain their current operation with respect to timing, at different speeds, if desired.

In summary, independent register responsive decoder controlled frequency selections allow shifting of the processor clock speed without affecting the other subsystem component clock speeds to enable the more optimum use and allocation of the higher clock speeds only when needed. Software complexity is thus greatly reduced by moving the clock shifting support internal to the data processor. Internal data processor control in turn will reduce software development time, size of the code, potential timing errors in the software, and will improve maintainability of the code. Internal control further optimizes the energy savings by just having the necessary real-time critical portions of the code, such as demodulation tasks for a portable two-way radio, run at the fastest rates. Those skilled in the art will recognize that modifications and variations can be made without departing from the teachings of the invention. Therefore, it is intended that this invention encompass all such variations and modifications as fall within the scope of the appended claims.

What is claimed is:

1. A data processing system having register controllable processor speed, the data processing system comprising:

a central processor which operates at a selectable program code clock;

a plurality of subsystem components;

a plurality of subsystem clock provision conductors connected to the plurality of subsystem components for independently providing a selectable subsystem clock speed for each of the plurality of subsystem components;

a plurality of addressable registers for storing a plurality of optimum speed values for use as a selectable address bus clock speed and the selectable subsystem clock speed for each of the subsystem components;

a selector circuit for reading a first one of the plurality of addressable registers to provide the optimum speed value for use as the selectable address bus clock speed and reading a second one of the plurality of addressable registers to provide a single one of the plurality of optimum speed values for use as the selectable subsystem clock speed of a first one of the plurality of subsystem clock provision conductors for a first one of the plurality of subsystem components; and a communication bus coupled to the central processor, the plurality of subsystem components, the plurality of addressable registers, and the selector circuit for communicating contents of the plurality of addressable registers for use by the selector circuit.

2. An apparatus for reducing the power usage of a data processor utilizing a stored energy power source comprising:

a data and address bus for accessing information within the data processor;

a central processor coupled to the data and address bus having a selectable address bus clock operating speed;

a plurality of subsystem components coupled to the data and address bus having a plurality of associated subsystem clock provision conductors providing a selectable subsystem clock speed for each of the plurality of subsystem components;

a plurality of addressable registers coupled to the data and address bus for storing a plurality of optimum speed values for use as the selectable address bus clock speed and the selectable subsystem clock speed for each of the plurality of subsystem components;

a plurality of processor status conductors for monitoring instructions executed by the central processor and for operating with the data and address bus;

a multiple clock generator for sourcing a plurality of discrete frequencies available to the central processor and the plurality of subsystem components, as determined by the contents of the plurality of addressable registers;

an address bus frequency selector, coupled to the data and address bus and the multiple clock generator, for reading the contents a first one of the plurality of addressable registers to couple a first selected one of the plurality of discrete frequencies as the optimum speed value for use as the selectable address bus clock speed of the central processor; and a subsystem frequency selector, coupled to the data and address bus and the multiple clock generator, for reading the contents of a second one of the addressable registers to couple a second selected one of the plurality of discrete frequencies as the optimum speed value for use as the selectable subsystem clock speed of a first one of the plurality of subsystem clock provision conductors for a first one of the plurality of subsystem clock components to enable the reduction of power usage dependent upon the first and second selected one of the frequencies utilized in the data processor operation.

3. A reduced power data processor system having register controllable processor speed, the reduced power data processing system comprising:

a data and address bus for accessing information within the data processor;

a central processor coupled to the data and address bus having a selectable address bus clock operating speed;

a plurality of subsystem components coupled to the data and address bus having a plurality of associated subsystem clock provision conductors providing a selectable subsystem clock speed for each of the plurality of subsystem components;

a plurality of addressable registers coupled to the data and address bus for storing a plurality of pre-selected optimum speed values for use as the selectable address bus clock speed and the selectable subsystem clock speed for each of the plurality of subsystem components;

a multiple clock generator for generating a plurality of discrete frequencies available to the central processor and the plurality of subsystem components, as determined by the contents of the plurality of addressable registers; and an address bus frequency selector, coupled to the data and address bus and the multiple clock generator, for reading contents of a first one of the plurality of addressable registers to couple a first selected one of the plurality of discrete frequencies as an optimum speed value for use as the selectable address bus clock speed of the central processor, wherein the address bus frequency selector includes a decoder for selecting the first selected one of the plurality of discrete frequencies as the optimum speed value for use as the selectable address bus clock speed of the central processor in response to the contents read from the first one of the plurality of addressable registers.

4. The system of claim 3 further comprising a subsystem frequency selector, coupled to the data and address bus and the multiple clock generator, for reading contents of a second one of the addressable registers to couple a second selected one of the plurality of discrete frequencies as the optimum speed value for use as the selectable subsystem clock speed of a first one of the plurality of subsystem clock provision conductors for a first one of the plurality of subsystem clock components to enable the reduction of power usage dependent upon the first and second selected one of the plurality of discrete frequencies utilized in the data processor operation.

5. The system of claim 3 wherein the decoder comprises a four-to-sixteen conductor decoder for picking one of sixteen frequencies based on a four bit pre-selected frequency selection read from the contents of the first one of the plurality of addressable registers.

6. The system of claim 3 wherein the first one of the plurality of addressable registers comprises a read and write memory map location vectored by an executed conductor of code.

7. The system of claim 6 further comprising at least one digital comparator for reading the executed conductor of code and for vectoring to the first one of the plurality of addressable registers in response to the memory map location of the executed conductor of code.

8. The system of claim 7 further comprising a plurality of memory location tester registers for setting the basis of comparison for the at least one digital comparator.

9. The system of claim 8 wherein the plurality of memory location tester registers comprise a plurality of lower test limit registers and a plurality of upper test limit registers for comparison against a latched code address byte.

10. The system of claim 9 further comprising a task register memory model for initializing the storage of the plurality of pre-selected optimum speed values as a reference by the latched code address byte.

* * * * *